FERROELECTRIC CONDENSER TRANSFER CIRCUIT AND ACCUMULATOR

Filed Oct. 1, 1953 2 Sheets-Sheet 1

INVENTOR.
DONALD R. YOUNG

BY William V. Schelberg
AGENT

Dec. 29, 1959 D. R. YOUNG 2,919,063

FERROELECTRIC CONDENSER TRANSFER CIRCUIT AND ACCUMULATOR

Filed Oct. 1, 1953 2 Sheets-Sheet 2

INVENTOR
DONALD R. YOUNG

BY William V Schelberg
AGENT

United States Patent Office 2,919,063

Patented Dec. 29, 1959

2,919,063

FERROELECTRIC CONDENSER TRANSFER CIRCUIT AND ACCUMULATOR

Donald R. Young, Poughkeepsie, N.Y., assignor to International Business Machines Corporation, New York, N.Y., a corporation of New York Application October 1, 1953, Serial No. 383,536

13 Claims. (Cl. 235—92)

This invention relates to information handling systems of the variety in which binary digits are stored progressively in a series of consecutive stages comprising one or more ferroelectric capacitors, and is directed in particular to circuits for controlling the transfer of binary representations between the several stages of storage.

Ferroelectric capacitors employ dielectrics which depend upon internal polarization of the material rather than surface charge for storage, and a number of such ferroelectric materials are known such as barium titanate, Rochelle salt and potassium niobate for example. Ferroelectrics are so termed because of characteristic similarities to ferromagnetic materials and a curve representing dielectric induction plotted versus electric field intensity is comparable to the B–H curve for ferromagnetic materials.

Arrangements of ferroelectric capacitors in consecutive stages with each stage composed of one or more elements is known in the art. Each pair of adjoining stages is coupled through a transfer circuit whereby a change in the condition of polarization of the ferroelectric capacitor in one stage may effect a change in the condition of the ferroelectric capacitor in the next stage. A simple example of this is in a shifting register or information delay line comprising a series of stages in which the ferroelectric capacitors are in a binary zero condition. To enter a binary one in any position, a read in pulse is applied to reverse the state of polarization of the ferroelectric capacitor at that position. To read out the stored binary one, a read-out pulse is applied and the condition of polarization of that ferroelectric capacitor is reversed so as to be in a binary "zero" representing state. In the transition from one state to another, a transfer pulse is developed and is applied to the ferroelectric capacitor of the succeeding stage and the latter then changes from a "zero" to a "one" representing condition.

For the successful functioning of such a transfer operation, the circuits which couple adjoining stages must be capable of passing normal transfer pulses while discriminating against other pulses such as those which would cause a change in polarization of the ferroelectric elements in a reverse order or in an indiscriminate manner. In accordance with the invention, the function of discrimination is obtained through the use of a fixed voltage bias source in a novel manner.

Accordingly, a principal object of this invention is to provide a reliable transfer circuit for coupling successive stages of ferroelectric storage systems.

A further object is to provide means for discriminating between back transfer pulses and valid transfer pulses.

Another object is to provide a novel pulse discriminating circuit employing a reliable threshold voltage bias source.

Still another object of the invention is to provide improved component circuitry using ferroelectric capacitor storage elements and including novel provisions for suppressing back transfer and other spurious pulses.

Another object of the invention is to provide a ferroelectric capacitor accumulator employing the novel transfer circuit.

Other objects of the invention will be pointed out in the following description and claims and illustrated in the accompanying drawings, which disclose, by way of example, the principle of the invention and the best mode, which has been contemplated, of applying that principle.

Figure 1:
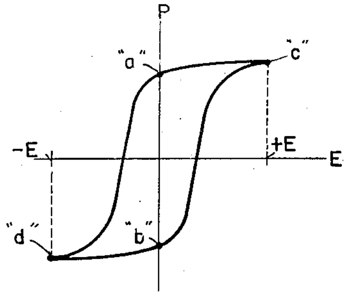
Fig. 1 is a diagrammatic representation of the hysteresis curve for a ferroelectric capacitor such as that employed in the systems illustrated and described.

In ferroelectric capacitors such as those employed in memory systems, materials having substantially rectangular hysteresis loops and low coercive force are desired. The hysteresis loop for a barium titanate crystal of this type is illustrated in Fig. 1 where the vertical axis represents the electrical displacement or degree of polarization (P) and the horizontal axis represents the electric field strength (E) which is proportional to the voltage applied across the terminals of the capacitor. In storing binary information, the state of polarization designated "*a*" is arbitrarily selected as representing a binary zero and state "*b*" then represents storage of a binary one. With the ferroelectric capacitor in a zero state "*a*", application of a negative pulse causes the hysteresis loop to be traversed from point "*a*" to point "*d*", which is the saturation point, and, on removal of this applied electric field, returns to point "*b*" at which it remains in a stable condition representing a binary one. A negative pulse is applied on readout and, with the capacitor in a state representing a stored binary one, the hysteresis curve is traversed from the point "*b*" to point "*c*" and, when the read out pulse terminates, goes to point "*a*". The slope of the hysteresis curve between points "*b*" and "*c*" is relatively great and, as the slope is proportional to the effective capacitance of the ferroelectric condenser, the change in polarization in going from point "*b*" to point "*c*" presents a large capacitance to the negative read out pulse. Application of the negative read out pulse in interrogating a capacitor which is in a binary zero representing state causes the hysteresis curve to be traversed from point "*a*" to point "*c*", and, on termination of the readout pulse, returns to point "*a*". The slope of the hysteresis curve between points "*a*" and "*c*" is small and this change is polarization therefore presents a low capacitance to the negative read out pulse.

The points "*a*" and "*b*" on the hysteresis loop are stable states of polarization and binary information thus represented and stored in the dielectric will remain for a considerable period without requiring regeneration or application of external energy for its maintenance. At the stable points "*a*" and "*b*," there is no net field within the ferroelectric condenser or external to it and the polarization charge is equal and opposite to the surface charge. Consequently, conduction through the dielectric does not destroy the information and the external leads may even be shorted without ill effects.

An electric field applied as a voltage pulse to the terminals of the ferroelectric condenser and of such magnitude as to exceed the coercive force, changes the polarization at a rate determined by the magnitude of the field and, if a negative pulse is applied for interrogation, either a transition from point "*a*" to point "*b*" or no net change occurs. This transition is equivalent to a net change in the charge across the ferroelectric condenser as described above and can be detected as a voltage appearing across a standard condenser connected in series with it.

Figure 2:
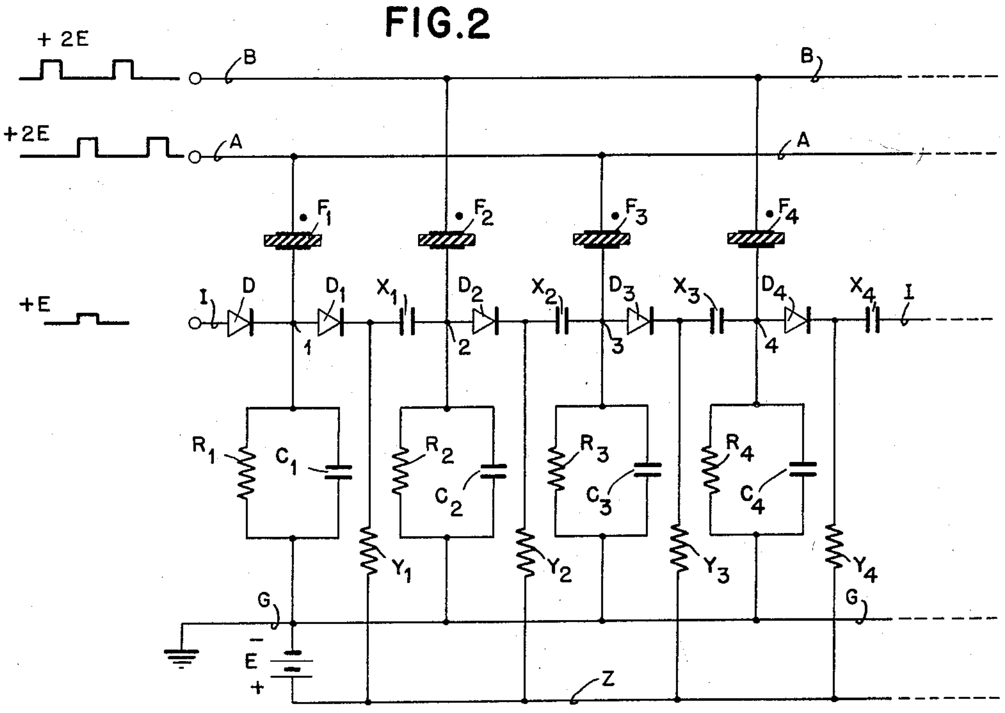
Fig. 2 is a schematic diagram illustrating a ferroelectric capacitor shifting register or delay line employing the novel transfer circuit.

Figure 2 illustrates an arrangement employing such a method of pulsing ferroelectric capacitors and producing output voltages indicative of their states of polarization or binary storage representations. In this figure, four stages of a delay line or shifting register are employed with a ferroelectric storage capacitor designated F at each stage. Obviously, additional stages may be provided. The circuit connections for each ferroelectric capacitor F comprise the novel transfer circuit which is adapted to pass a normal transfer pulse and to discriminate against all other pulses that may be applied between the several stages. Alternate ones of the ferroelectric storage capacitors F are connected to respective ones of a pair of lines A and B to which clock pulses are applied in alternation to advance a binary representation from stage to stage as will be more fully described. A polarity marking symbol consisting of a dot is shown adjacent one terminal of each of the ferroelectric condensers $F_1$, $F_2$, $F_3$ and $F_4$. Referring to the hysteresis loop of Figure 1, if a voltage pulse E is applied to a particular ferroelectric capacitor F with the polarity such that the positive terminal of the pulse source is connected to the "dot" side of the condenser, the polarization state of the condenser exists at point *"c"* for the duration of the applied positive pulse and will shift to point *"a"* on its termination. If the negative terminal of the pulse source is connected to the "dot" labeled side of the ferroelectric condenser, then it exists at point *"d"* and will return to point *"b"* on termination of the negative pulse.

The opposite terminal of each ferroelectric capacitor F is coupled to a parallel connected standard capacitor C and resistor R, which are given appropriate subscript labels, and the other junction of these two elements is connected to a grounded line G. An input conductor is connected to the junction of the ferroelectric capacitor F and paralleled RC circuit of each stage and these junction points are labeled 1, 2, 3, 4, etc. to correspond with the successive order of the several stages illustrated. Between the junction points of adjacent stages, a diode D and coupling capacitor X is connected in series with the input conductor I, and a large value resistor Y is connected to the common terminal of these elements and a bias line Z. The latter is connected at one end to the positive terminal of a fixed source of voltage E, here shown diagrammatically as a battery, and the negative terminal of the source E is connected to the ground line G.

Positive clock pulses of a magnitude twice that of the threshold bias source E are applied to the conductors A and B alternately and, as the positive pulse is applied to the "dot" side of the ferroelectric capacitors F, they will exist in states *"c"* and *"a"* alternately, as the positive pulses persist and terminate. The polarization state *"a"* is arbitrarily chosen as representative of a binary "zero" and state *"b"* as representative of a binary "one" as previously mentioned. A positive input pulse of a magnitude equal to that of the bias source E is applied to the conductor I through a diode D. This pulse appears at terminal I, and is equivalent to the application of a negative pulse to the "dot" marked side of the ferroelectric condenser $F_1$. Its application at an interval between the appearance of positive pulses on line A will then cause the capacitor $F_1$ to transfer to the polarization state *"d"* and, on its termination, to remain stably at point *"b"* representing a stored binary one. The input pulse applied to terminal 1 will not pass the diode $D_1$ to effect other stages of the register since the cathode of this diode is also at a potential E, maintained thereon by the connection from the bias source E and line Z through the resistor $Y_1$.

As a subsequent transfer or advancing pulse appears on the conductor A, the capacitor $F_1$, being in state *"b,"* transfers to state *"c"* and, due to the fact that a high capacity is presented, the voltage across capacitor $F_1$ cannot change instantaneously and a voltage of magnitude 2E, less the small drop across $F_1$, appears across the series connected capacitor $C_1$. The standard capacitor $C_1$ discharges through a current path including the diode $D_1$, resistor $Y_1$ and the bias battery E. The diode D is placed between terminal 1 and the input end of the conductor 1, and functions to prevent transmission of the voltage pulse to the signal source. As the capacitor $C_1$ discharges through diode $D_1$ in the path described, a voltage substantially of magnitude E is developed across the $Y_1$ resistor since the drop through this diode in the low resistance direction is substantially negligible. The left hand terminal of the coupling capacitor $X_1$ is now raised to a potential of approximately 2E because of the drop across resistor $Y_1$ and the threshold voltage source. The capacitance of condenser $X_1$ is made sufficiently large that the voltage drop across it is not changed materially for the duration of the advance pulse applied on conductor A and the potential of terminal 2 is now elevated to a magnitude of plus E. A summation of voltage drops around the loop comprising the resistor $Y_1$, capacitor $X_1$, capacitor $C_2$ and resistor $R_2$ in parallel and the bias source reveals that a drop of magnitude E appears across the capacitor $C_2$ and resistor $R_2$ between terminal 2 and ground line G. This positive voltage rise is applied to the ferroelectric capacitor $F_2$, causing it to transfer from the zero representing polarization state *"a"* to state *"b"* and the binary one originally placed in ferroelecric condenser $F_1$ is now stored in $F_2$. The voltage E appearing at terminal 2 cannot cause ferroelectric condenser $F_3$ to transfer from its "zero" representing state since the bias battery E maintains the cathode of the diode $D_2$ at a potential of plus E also through connection to the positive terminal of the threshold voltage source by resistor $Y_2$.

At a subsequent interval, an advance pulse appears on the conductor B and causes condenser $F_2$ to traverse its hysteresis loop and the pulse transfer operation is repeated from the second stage to the third stage and the binary one originally stored in condenser $F_1$ is then stored in condenser $F_3$. Only four stages of the shifting register are here illustrated although it is obvious that additional stages may be connected into the system without substantial change in the circuitry. Thus, to transfer the binary one down the line of coupled stages in succession, advancing pulses are applied alternately to the conductors A and B with back transfers prevented by the diodes D and forward transfer beyond the adjacent stage blocked by the threshold voltage source E. The source E is not required to furnish any power in this arrangement and can therefore serve a large number of transfer circuits without detrimental cross coupling effects due to its low internal impedance. Any arbitrary pulse pattern may be stored and transferred in the shifting register of Fig. 2 provided binary ones are not entered in adjacent stages of the apparatus.

Figure 3:
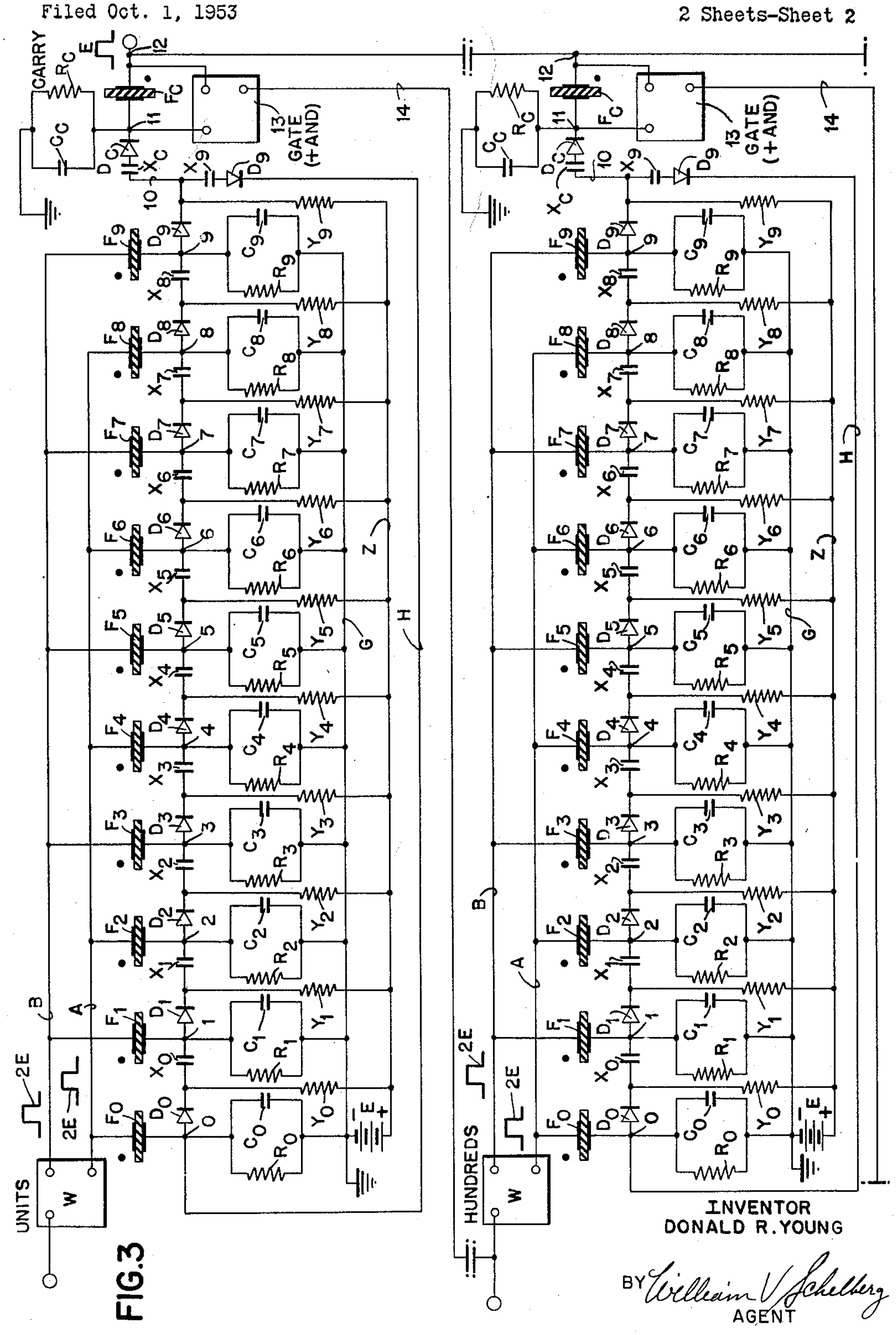
Fig. 3 illustrates a ring circuit employing ferroelectric capacitor storage elements in a manner to be used as a decimal accumulator.

Figure 3 illustrates the delay line employed as a decimal accumulator, however, this arrangement is obviously adaptable to any arithmetical system. In this system, two orders of counters are shown each of which comprises ten storage stages such as those illustrated in Fig. 2. The ferroelectric capacitors of these stages are numbered $F_0$, $F_1$, $F_2$ . . . $F_9$ and the output terminal of the $F_9$ stage is connected by a conductor H to terminal 0 of the $F_0$ stage, forming a closed ring about which a binary one may be circulated. The A and B leads are alternately pulsed to advance the binary representations from stage to stage successively as heretofore but in this arrangement, input pulses to be accumulated are applied to a flip-flop circuit W. Each input pulse to the flip-flop causes one or the other of the leads A and B to be alternately raised in potential so that each input pulse then advances the counter one stage position.

A lead 10 is coupled to the junction of the $Y_9$ resistor and $D_9$ diode, and connects through a coupling capacitor $X_c$ and diode $D_c$ to a terminal 11 of a carry network, one of which is provided for each order of the accumulator. The carry network comprises a ferroelectric capacitor storage unit including a capacitor $F_c$ coupled at one side to the terminal 11 and to a source of carry clock pulses (not shown) through a lead 12 at the other side. Terminal 11 also is connected to a parallel resistor and capacitor $R_c$ and $C_c$, which parallel circuit is grounded at the opposite end. The two inputs of a plus AND gate circuit 13 of conventional design are connected to the terminal 11 and to lead 12 respectively, and an output lead 14 is connected to the read-in lead of the flip-flop W of the next higher order counter.

Figure 4:
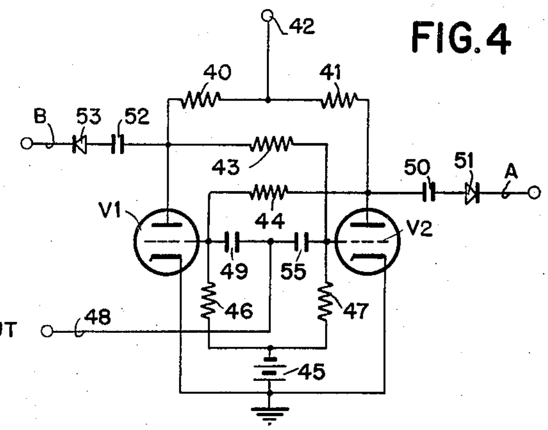
Fig. 4 illustrates in detail one of the components shown in block form in Fig. 3.

The flip-flop W shown in block form in Figure 3 is illustrated in detail in Figure 4 and will be only briefly described as it is essentially a modification of the conventional Eccles-Jordan trigger circuit. This form of multivibrator employs direct coupling between the plates and grids of two tubes $V_1$ and $V_2$ and forms a circuit possessing two conditions of stable equilibrium. One condition is when the tube $V_1$ is conducting and tube $V_2$ is cut off; and the other is when the tube $V_2$ is conducting and $V_1$ is cut off. The circuit remains in one or the other of these two conditions until some action causes the non-conducting tube to conduct. The tubes then reverse their functions and remain in the new condition as long as no plate current flows in the cut-off tube. Output circuits coupled to the plates of each of the tubes then are subjected to alternate high and low voltage levels as the corresponding tube is conductive or nonconductive in response to input pulses applied to the commonly connected grids.

The plates of each of the tubes $V_1$ and $V_2$ are coupled through resistors 40 and 41 to a source of positive potential applied at terminal 42. The grids and plates are mutually coupled through resistors 43 and 44, respectively, and both of the tube cathodes are grounded. A source of bias voltage 45 is coupled through resistors 46 and 47, respectively, to the grids of tubes $V_1$ and $V_2$ and the grids are further connected to a source of input pulses applied on lead 48 through coupling capacitors 49 and 50. Output leads are coupled to the plates of the tubes $V_1$ and $V_2$ and include a series connected capacitor and diode 50 and 51 for output A and 52 and 53 for output B.

Assume that tube $V_2$ is initially conducting and an input pulse is applied to the lead 48 and through capacitors 49 and 50 to both tube grids. A positive pulse on the grid of tube $V_2$ has little or no effect on the flow of current, however, tube $V_1$ is cut off and as the negative grid bias from source 45 is momentarily removed, current flows through the plate circuit of tube $V_1$ and the voltage at its plate decreases due to the drop developed through resistor 40. This decrease in potential is applied to the grid of tube $V_2$ through resistor 43 and its current now drops off. The resulting drop across resistor 41 then decreases and the grid of tube $V_1$, which is coupled through resistor 44 to this point, is further raised in potential. This action is cumulative so that when the voltage across tube $V_2$ is considerably less than the voltage of source 45, the voltage across resistor 47 is sufficient to cut off the tube $V_2$. The positive rise in plate potential at tube $V_2$ charges condenser 50 and a pulse passes diode 51 so that as a result, a positive pulse appears at the output lead A. The plate of tube $V_1$ has now been lowered in potential, however, due to the blocking action of diode 53, no output pulse appears at terminal B.

The second input pulse cuts off tube $V_1$ and turns on tube $V_2$ in a similar manner with a positive output pulse then produced only at the B terminal. Each successive input pulse to the unit W then produces a positive output pulse alternately on leads A and B.

Initially, the ferroelectric capacitors $F_1$ to $F_9$ and $F_c$, shown in Fig. 3, are in a binary zero representing state of polarization or in state "*a*" (see Fig. 1) while the capacitor $F_0$ is in a binary one representing state or at point "*b*," and the flip-flops W are set so that the leads A and B are at ground potential with lead A the next to be pulsed. As a first pulse to be counted is applied to the input terminal of flip-flop W, lead A is pulsed positively, as described, and capacitor $F_0$ which is connected to this lead traverses its hysteresis loop from state "*b*" to state "*a*." Since a high capacity is presented by the ferroelectric capacitor in making this transition and the voltage across $F_0$ cannot change instantaneously, a voltage of a magnitude 2E, less the negligible drop across $F_0$, appears across the series connected standard capacitor $C_0$, and the latter discharges through the diode $D_0$, resistor $Y_0$ and the bias source E. A voltage ideally of magnitude 2E is present at terminal 0 but is unable to pass in a reverse direction through the stages because of diode $D'_9$ and $D_9$. A voltage of magnitude E is developed across resistor $Y_0$ and is applied to terminal 1 through the condenser $X_0$, and causes condenser $F_1$ of the adjacent stage to transfer from state "*a*" to state "*b*." The following input pulse applied to the flip-flop W raises the potential of line B and the ferroelectric condenser $F_1$ traverses its hysteresis loop from state "*b*" to state "*a*" and a voltage substantially of a value plus E is applied to terminal 2 causing the succeeding storage condenser $F_2$ to traverse its hysteresis loop from point "*a*" to point "*b*." Each successive input pulse thus causes the binary one originally stored in stage $F_0$ to consecutively shift from one stage to the adjacent stage in like manner. Following the ninth input pulse to be counted, the ferroelectric capacitor $F_9$ is in a polarization state "*b*" and all others including $F_c$ are in state "*a*." The tenth input pulse raises the potential of line B and condenser $F_9$ presents a high capacitance to the pulse in going from state "*b*" to state "*a*." A voltage of plus E is, as heretofore in preceding stages, developed across the resistor $Y_9$ and in addition to causing the capacitor $F_0$ to change from state "*a*" to state "*b*," a voltage of plus E is applied via conductor 10, capacitor $X_c$, and diode $D_c$ to terminal 11 and the carry capacitor $F_c$. The ferroelectric capacitor $F_c$ now traverses its hysteresis loop from state "*a*" to state "*b*."

In accumulating decimal information recorded for example in perforated record cards, a field comprising a plurality of columns of the cards are provided for recording a single multiple digit number. The cards are fed past a row of sensing brushes and pulses are obtained at differential times relative to the digit value of the number 0 to 9 recorded in each column. These differentially timed pulses are thereafter converted to a series of pulses corresponding in number to the digit value in each column of the card and may be applied to an accumulator in a manner similar to that disclosed in U.S. Patent application Serial No. 306,983, which was filed August 29, 1952, now Patent No. 2,829,830. During the interval between the reading of successive cards, a carry time is provided to advance the next higher order counter ahead one increment if the orders have accumulated more than ten increments including the digit read from the last card and that previously standing in the counter.

At the carry time interval in the ferroelectric accumulator system of this invention, a positive pulse of magnitude E is applied to the carry leads 12 of each order and those counter orders in which an input pulse has caused a transfer of the binary one from storage capacitors $F_9$ to $F_0$, the carry network capacitor $F_c$ is in a state "*b*," as described, and the carry pulse applied to lead 12 causes the capacitor $F_c$ to traverse its hysteresis loop from point "b" to point "a." Terminal 11 is raised to a potential substantially of a value plus E since the capacitor $F_c$ cannot instantaneously charge, and the voltage drop appears principally across the standard capacitor $C_c$. At this time, both inputs to the plus AND circuit 13 are positive and an output pulse appears on lead 14 causing the flip-flop W of the next higher order counter to function and advance that order counter one position.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. Apparatus for transferring information by voltage pulses comprising a first ferroelectric storage means having alternate states of stable polarization, input means coupled to a first terminal for causing said first ferroelectric storage means to assume one of said stable polarization states, readout means coupled to the opposite terminal for resetting said first storage means to the other of said stable polarization states, second ferroelectric storage means having alternate states of stable polarization, second input means coupled to a first terminal for causing said second storage means to assume one of said stable polarization states, second read-out means coupled to the opposite terminal for resetting said second storage means to the other of said stable polarization states, and transfer circuit means coupling the first terminals of said first and second ferroelectric storage means, said transfer circuit means including a semiconductor and series connected capacitor, and a fixed source of bias voltage coupled to said semiconductor for discriminating against voltage pulses of certain polarity and magnitude.

2. Apparatus for transferring information by voltage pulses comprising a plurality of ferroelectric storage capacitors each capable of assuming alternate stable states of polarization, means for selectively causing at least one of said capacitors to assume one of said stable states of polarization, readout means comprising a source of pulses of uniform polarity coupled to a first terminal of said capacitors and operable upon said capacitors for resetting those capacitors in said one stable state to the other stable state, circuit means coupled to a second terminal of said capacitors adapted to furnish an output voltage pulse having a magnitude determined by the respective states of said capacitors during operation of said read out means, and pulse transfer circuit means coupling the second terminal of adjacent ones of said ferroelectric capacitors, said circuit means comprising a series connected diode and capacitor, said circuit means including a source of fixed and constant voltage connected to said diode for suppressing voltage pulses having less than a predetermined magnitude.

3. A shifting register comprising a series of ferroelectric storage elements each capable of assuming two alternate states of stable polarization, input means coupled to one terminal for selectively causing said elements to assume one of said stable states of polarization, readout means coupled to the opposite terminal operable to reset the respective elements in said one stable state to the other stable state, circuit means including said elements adapted to furnish an output voltage pulse having a magnitude determined by the respective states of said elements during operation of said read out means, and a plurality of consecutive transfer circuits each coupling the output means of one of said storage elements to the input means of the next adjacent element for causing the next adjacent element to assume said one state of polarization when the one storage element is reset from one to the other of said stable states, each of said transfer circuits including a unidirectional current-controlling device conductive in the direction of said output voltage pulse, and a common voltage source connected to each of said unidirectional current-controlling devices for supplying a bias voltage of fixed value to the current-controlling devices of each of said transfer circuits to discriminate against voltage pulses which are less than a predetermined magnitude.

4. A ferroelectric counter circuit comprising a series of ferroelectric capacitor storage elements each having two terminals and capable of assuming two alternate stable states of polarization, input means coupled to one terminal for selectively causing said elements to assume one of said stable polarization states, advancing means coupled to the opposite terminal and operable to reset the respective elements in said one stable state to the other stable state, output circuit means coupled to the one terminal of said elements and adapted to produce a voltage pulse having a magnitude determined by the respective states of said elements, transfer circuits coupling said output circuit means to the input means of the adjacent element so as to form a closed series of storage elements and adapted to cause the next adjacent element to assume said one state of polarization when its predecessor is reset from one to the other of said stable states, each of said transfer circuits including a diode, and a common fixed voltage source coupled to said diode to discriminate against voltage pulses of less than a predetermined magnitude.

5. Apparatus as set forth in claim 4 in which said advancing means includes a pair of conductors respectively coupled to alternate ones of said storage capacitors, said conductors being alternately subjected to voltage pulses to be counted.

6. In a ferroelectric counter arrangement, a plurality of digit position representing ferroelectric storage capacitors capable of assuming two alternate stable states of polarization, advancing means adapted to apply a unipolar controlling potential alternately to odd and even numbered ones of said storage capacitors corresponding with the sequence of application of odd and even numbered input count pulses, input circuit means for causing said ferroelectric capacitors to assume one of said stable polarization states when pulsed, output circuit means coupled to said ferroelectric capacitors and adapted to produce a voltage pulse having a magnitude determined by the respective states of said storage capacitors on application of a controlling potential by said advancing means, and transfer circuit means coupling the output circuit means of each storage capacitor with the input circuit means of the next adjacent storage capacitor so as to form a closed storage ring, said transfer circuit means including a series connected diode, and a common fixed voltage source connected with each of said diodes to discriminate against voltage pulses of less than a predetermined magnitude.

7. In a ferroelectric counter, a plurality of serially arranged ferroelectric capacitor storage elements each capable of assuming either a first or second stable state of polarization and with only one of said elements being in said first state, transfer circuit means coupling said elements in a closed ring, said transfer circuit means comprising a series connected diode and standard capacitor coupled between terminals of adjacent ferroelectric capacitor storage elements, and means for biasing said diodes to discriminate against pulses of less than a predetermined magnitude, advancing means for causing the storage element adjacent that element in a first stable state to assume a first stable state and said preceding element to revert to said second stable state in response to the application of an input pulse to be counted so that said series of storage elements assume a first stable state in predetermined sequence corresponding with the sequence of application of pulses to be counted.

8. An accumulator system composed of a plurality of ferroelectric counter units, one for each order of the accumulator, said counter units comprising a group of ferroelectric capacitor storage elements individually coupled by transfer circuit means to form a closed ring, said transfer circuit means comprising a series connected diode and standard capacitor coupled between terminals of adjacent ferroelectric capacitor storage elements, and means for biasing said diodes to discriminate against pulses of less than a predetermined magnitude, each of said elements being capable of assuming either a first or second stable state of polarization and with only one of said elements being in said first state, advancing means for causing the storage element adjacent that element in a first stable state to assume a first stable state and that element to revert to the second stable state in response to application of an input pulse to be counted so that said group of storage elements assume a first stable state in predetermined sequence corresponding with the sequence of application of input count pulses, and carry means actuated in response to transfer of a predetermined one of said elements in each order from a second to a first stable state and coupled to the advancing means of the next higher order counter of said accumulator.

9. An accumulator system as set forth in claim 8 wherein said carry means comprises a ferroelectric storage capacitor.

10. An accumulator as set forth in claim 8 wherein said advancing means includes trigger means operable in one stable state to apply a voltage pulse to the even numbered storage elements and in another stable state to apply a voltage pulse to odd numbered storage elements of each counter group, said trigger means reversing stable states in response to each input count pulse.

11. An accumulator system composed of a plurality of ferroelectric counter units, one for each order of the accumulator, said counter units comprising a group of ferroelectric storage elements individually coupled by transfer circuit means to form a closed ring, each of said elements being capable of assuming either a first or a second stable state of polarization and with only one of said elements being in said first stable state, said transfer circuit means comprising a diode and a series connected standard capacitor coupled between terminals of adjacent ferroelectric storage elements, and means for biasing said diodes to discriminate against voltage pulses of less than a predetermined magnitude, advancing means including trigger means operable in one stable state to apply a voltage pulse to the even numbered storage elements and in another stable state to apply a voltage pulse to odd numbered storage elements of each counter group, said trigger means reversing stable states in response to each input count pulse to the respective order, said advancing means causing the storage element adjacent that element in a first stable state to assume a first stable state and that element to revert to the second stable state in response to application of each count pulse so that elements of each group assume a first stable state in sequence corresponding with the sequence of application of input count pulses, and carry means comprising another ferroelectric capacitor coupled to the trigger circuit associated with the next higher order counter of said accumulator.

12. Apparatus for transferring information by voltage pulses comprising a plurality of ferroelectric capacitors each capable of assuming alternate stable states of polarization in representing binary data, first circuit means connecting terminals of alternate ones of said ferroelectric capacitors, second circuit means connecting like terminals of the remaining ones of said plurality of ferroelectric capacitors, said first and second circuit means being adapted to alternately direct pulses of the same polarity to the associated capacitors to establish a datum polarization state therein if not already in said state, transfer circuit means comprising a series connected diode and standard capacitor coupled between like terminals of adjacent ferroelectric capacitors, and means for biasing said diodes for discriminating against voltage pulses of certain polarity and magnitude.

13. A shifting register comprising a plurality of ferroelectric capacitors each capable of assuming alternate stable states of polarization in representing binary information, first circuit means connecting terminals of alternate ones of said ferroelectric capacitors, second circuit means connecting like terminals of the remaining ones of said ferroelectric capacitors, further circuit means including an individual parallel connected resistor and standard capacitor connected to like terminals of each of said ferroelectric capacitors, said first and second circuit means being adapted to alternately receive pulses of the same polarity to establish a datum polarization state therein if not already in said state, transfer circuit means comprising a series connected diode and further standard capacitor coupled to said like terminals of adjacent ferroelectric capacitors, and means for biasing said diodes.

References Cited in the file of this patent

UNITED STATES PATENTS

| | | |
|---|---|---|
| 2,580,771 | Harper | Jan. 1, 1952 |
| 2,622,213 | Harris | Dec. 16, 1952 |
| 2,623,170 | Dickinson | Dec. 23, 1952 |
| 2,625,326 | Mumma | Jan. 13, 1953 |
| 2,683,819 | Rey | July 13, 1954 |
| 2,717,372 | Anderson | Sept. 6, 1955 |
| 2,760,087 | Felker | Aug. 21, 1956 |
| 2,781,447 | Lester | Feb. 12, 1957 |
| 2,819,840 | Huntley et al. | Jan. 14, 1958 |

OTHER REFERENCES

"Ferroelectric Storage Elements for Digital Computers and Switching Systems," by J. R. Anderson. Published in Electrical Engineering, October 1952, pp. 916–921.